United States Patent [19]
Goto et al.

[11] Patent Number: 6,092,109
[45] Date of Patent: Jul. 18, 2000

[54] INFORMATION MATCHING SYSTEM AND ITS MATCHING METHOD FOR MATCHING INFORMATION BETWEEN TERMINAL EQUIPMENT CONNECTED VIA NETWORK

[75] Inventors: Hitoshi Goto, Tokyo; Shunichi Kondou; Hajime Mizoguchi, both of Kanagawa, all of Japan

[73] Assignee: NEC Corporation, Tokyo, Japan

[21] Appl. No.: 09/106,015

[22] Filed: Jun. 29, 1998

[30] Foreign Application Priority Data

Jun. 30, 1997 [JP] Japan .................................. 9-172677

[51] Int. Cl.⁷ .......................... G06F 13/38; G06F 15/17
[52] U.S. Cl. ........................ 709/224; 709/237; 370/385
[58] Field of Search .................................. 709/223, 224, 709/225, 226, 237; 370/385, 231

[56] References Cited

U.S. PATENT DOCUMENTS

| | | | |
|---|---|---|---|
| 5,701,427 | 12/1997 | Lathrop | 709/237 |
| 5,724,514 | 3/1998 | Arias | 709/224 |
| 5,822,569 | 10/1998 | McPartlan et al. | 709/237 |
| 5,905,724 | 5/1999 | Carson et al. | 370/385 |

FOREIGN PATENT DOCUMENTS

| | | |
|---|---|---|
| 63-13443 | 1/1988 | Japan . |
| 1-136498 | 5/1989 | Japan . |
| 3-98338 | 4/1991 | Japan . |
| 3-168434 | 7/1991 | Japan . |
| 5-110542 | 4/1993 | Japan . |
| 5-122286 | 5/1993 | Japan . |

OTHER PUBLICATIONS

Johnson, D. B.; "Distributed System Fault Tolerance Using Message Logging and Checkpointing"; Phd Thesis; Univ. of Houston; Dec. 1989; pp35–73.

Cohrs, D. L.; "A Specification Language for Multi–Domain Network and Distributed Systems Management"; pp13–17; Univ. of Wisconsion; 1991.

Primary Examiner—Mark H. Rinehart
Attorney, Agent, or Firm—Foley & Lardner

[57] ABSTRACT

An information matching system having managing equipment and managed equipment which are connected over a network, the managed equipment comprising a state monitor for creating a notice message with a sequence number informing the managing equipment of a change of the own state and a controller for resending a log of a necessary notice message to the managing equipment according to an instruction from the managing equipment, the managing equipment comprising a management information updating unit for checking whether the sequence number attached to the notice message delivered from the managed equipment is successive or not and a controller for giving a resending instruction of a log of a notice message having the missing sequence number to the managed equipment.

8 Claims, 4 Drawing Sheets

INFORMATION MATCHING SYSTEM AND ITS MATCHING METHOD FOR MATCHING INFORMATION BETWEEN TERMINAL EQUIPMENT CONNECTED VIA NETWORK

BACKGROUNDS OF THE INVENTION

1. Field of the Invention

The present invention relates to an information matching system and its matching method for matching information on the state of equipment to be managed by managing equipment (hereinafter, referred to as management information) with actual state of the managed equipment in communication between terminal equipment connected via a network.

2. Description of the Related Art

In a system having a plurality of terminal equipment via a network, the plurality of terminal equipment consisting of managing equipment for managing the state of each terminal equipment and managed equipment to be managed by the managing equipment, an event notice informing the change, if a change of the state occurred in some managed equipment, is issued from the managed equipment to the managing equipment, and the management information in the managing equipment is updated, thereby performing information matching processing. A change of the state means, by way of example, occurrence of a failure, restoration, modification of various setting in the managed equipment, and detachment and attachment of a new hardware package.

When using TCP/IP(Transmission Control Protocol/Internet Protocol) as a communication protocol among terminal equipment over a network, such a TCP (Transmission Control Protocol) having a resending function is used for the communication of information requiring reliability. By the TCP, however, the communication speed is slow for the performance of the resending processing. Therefore, a use of the TCP in all the communication of information would be a great burden and inefficient. Instead, the UDP (User Datagram Protocol) having no resending function and hence enabling high speed communication is used for the above-mentioned event notice informing managing equipment that the state of managed equipment has been changed.

If the above-mentioned event notice informing managing equipment about a change of the state of managed equipment is lost on the way in communication, the management information on the managed equipment in the managing equipment is out of accord with the actual state of the managed equipment. When using the UDP as a protocol, the UDP would not resend an event notice, which is incapable of recovering the disagreement between the management information and the actual state.

In order to solve this problem, there is a method of periodically reading out information including histories about all the changes of the state of managed equipment to be managed by managing equipment, by use of the TCP having a resending function. This enables the managing equipment to obtain the lost event notice, even if losing given event notice, thereby to match the management information of the managing equipment with the actual state of the managed equipment.

However, a large amount of data communication in periodically reading out the information including histories about all the changes of the state of each managed equipment, results in increasing communication load of terminal equipment and a network.

SUMMARY OF THE INVENTION

An object of the present invention is to provide a network information matching system and its matching method capable of decreasing communication load by resending only the lost notice massage being specified when losing a notice message informing a change of the state.

In addition to the above object, another object of the present invention is to provide a network information matching system and its matching method capable of matching the mutual state of terminal equipment quickly and easily by requiring to resend the notice message at once if detecting a lost notice message.

According to the first aspect of the invention, an information matching system, performing communication among terminal equipment connected via a network, for matching content of management information about state of managed equipment to be managed by managing equipment with actual state of the managed equipment, wherein the managed equipment comprises a state monitoring means for monitoring the state of the own equipment, creating a notice message if a change of the state occurs, attaching a sequence number to every created notice message, and delivering it to the managing equipment, a log storing means for storing a log of the sequence number-attached notice message created by the state monitoring means, and a replying means for reading out a log of a necessary notice message from the log storing means according to an instruction of the managing equipment and delivering it to the managing equipment, while the managing equipment comprises a management information storing means for storing management information about the state of the managed equipment, a management information updating means for updating the management information stored in the management information storing means according to the notice message and the sequence number attached thereto that are delivered from the managed equipment, and checking whether the sequence number included in the management information and the sequence number attached to the notice message are continued or not, and a resending requesting means for giving a resending instruction of a log of the notice message having the missing sequence number to the managed equipment when discontinuity of the sequence numbers is detected by the management information updating means.

In the preferred construction, based on a notice message issued according to occurrence of a change in the state of every managed equipment, the management information storing means stores each combination of the content of the change indicated in the notice message and the corresponding sequence number attached to the notice message, as management information on the managed equipment.

In the preferred construction, the management information updating means checks the continuity and the presence of a missing number by comparison between the sequence number included in the management information stored in the management information storing means and the sequence number attached to the received notice message, and the resending requesting means requires the managed equipment to resend a notice message having the sequence number judged to be missing by the management information updating means.

In another preferred construction, the state monitoring means of the managed equipment detects, at least, a failure of the own equipment and its restoration as a change of the state.

According to the second aspect of the invention, an information matching method for performing communication among terminal equipment connected via a network and matching content of management information about state of managed equipment to be managed by managing equipment with actual state of the managed equipment, the method comprising the steps of in the managed equipment, a step of monitoring the state of the own equipment, creating a notice message if a change of the state occurs, attaching a sequence number to every created notice message, and delivering it to the managing equipment, a step of storing a log of the created sequence number-attached notice message in the log storing means, and a step of reading out a log of a necessary notice message from the log storing means according to an instruction from the managing equipment and delivering it to the managing equipment, while in the managing equipment, a step of checking whether the sequence number attached to the notice message delivered from the managed equipment and the sequence number included in the management information are continued or not, and a step of giving a resending instruction of a log of a notice message having the missing sequence number to the managed equipment when the sequence numbers are not continued.

In the preferred construction, the information matching method further comprises, in the managed equipment, a step of updating the management information based on the notice message and a sequence number attached to the same notice message when the sequence numbers are continued as a result of the examination of the sequence number checking step.

According to another aspect of the invention, a computer readable memory storing a control program for controlling managing equipment and managed equipment, for use in an information matching system, of performing communication among terminal equipment connected via a network, for matching content of management information about the state of the managed equipment to be managed by the managing equipment with actual state of the managed equipment, the control program comprising in the managed equipment, a step of monitoring the state of the own equipment, creating a notice message if a change of the state occurs, attaching a sequence number to every created notice message, and delivering it to the managing equipment, a step of storing a log of the created sequence number-attached notice message in the log storing means, and a step of reading out a log of a necessary notice message from the log storing means according to an instruction from the managing equipment and delivering it to the managing equipment, while in the managing equipment, a step of checking whether the sequence number attached to the notice message delivered from the managed equipment and the sequence number included in the management information are continued or not, and a step of giving a resending instruction of a log of a notice message having the missing sequence number to the managed equipment when the sequence numbers are not continued.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
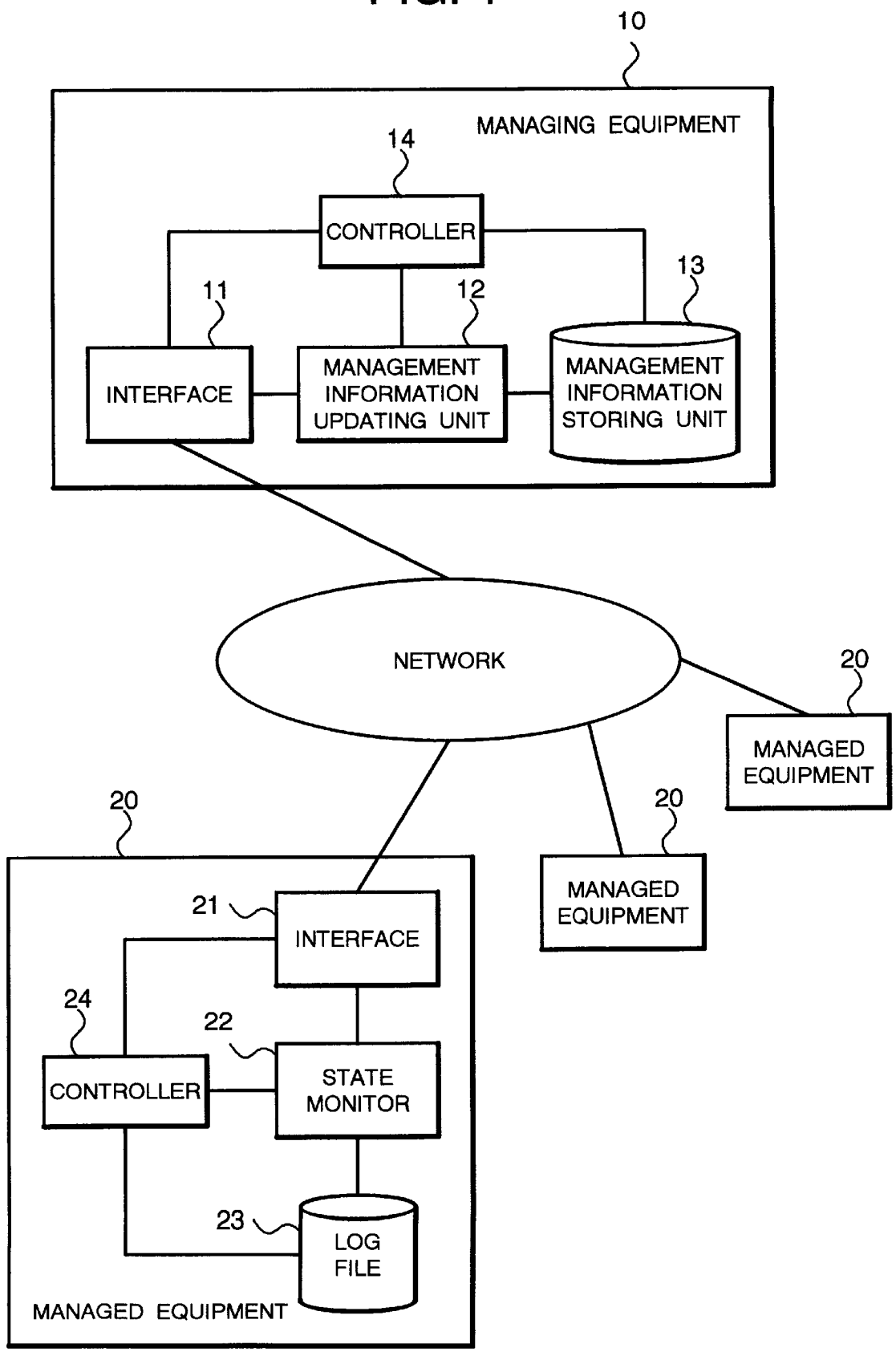
FIG. 1 is a block diagram showing the structure of a network information matching system according to an embodiment of the present invention.

FIG. 1 is a block diagram showing the structure of a network information matching system according to an embodiment of the present invention. As illustrated in FIG. 1, the network information matching system of the embodiment comprises a plurality of terminal equipment connected via a network, the plurality of terminal equipment consisting of managing equipment 10 for managing each terminal equipment connected to the network and each managed equipment 20 to be managed by the managing equipment 10. The managing equipment 10 includes an interface 11 for transferring information via a network, a management information updating unit 12 for updating management information of each managed equipment 20, a management information storing unit 13 for storing the management information of each managed equipment 20, and a controller 14 for controlling each function executing unit 11, 12, and 13. The management information means the information indicating the state of each managed equipment 20. The managed equipment 20 includes an interface 21 for transferring information via a network, a state monitor 22 for monitoring the state of the own equipment and creating a notice message if a change of the state occurs, a log file 23 for storing a log of the created notice message, and a controller 24 for controlling each function executing unit 21, 22, and 23. FIG. 1 shows only the characteristic components in the embodiment, and the description of the other general components is omitted. Each managed equipment 20 shown in FIG. 1 has the same structure, and hence, with the description of the structure of only one managed equipment 20, the description of the structure of the other managed equipment 20 is omitted.

In the managed equipment 20, the state monitor 22 may be realized by, for example, a program-controlled CPU and an internal memory such as a RAM or the like. While monitoring the state of the own equipment, it creates a notice message indicating the change when detecting a change of the state and attaches the sequence number to the message. The notice message with the sequence number attached there is delivered to the managing equipment 10 via the interface 21 and it is stored in the log file 23.

The controller 24 may be realized by, for example, a program-controlled CPU and an internal memory such as a RAM or the like. It controls each operation of the interface 21, the state monitor 22, and the log file 23, and reads out the log of a required notice message from the log file 23 according to the instruction of the managing equipment 10, so to deliver it to the managing equipment 10 via the interface 21. The computer program for controlling the controller 24 is provided, stored in a general storing medium such as a magnetic disk, an optical disk, a semiconductor memory, or the like, and it is loaded in the controller 24 to execute the above function.

In the managing equipment 10, the management information updating unit 12 may be realized by, for example, a program-controlled CPU and an internal memory such as a RAM or the like. Receiving a notice message delivered from managed equipment 20 to the interface 11 via a network, the unit 12 updates the management information on the same managed equipment 20 stored in the management information storing unit 13 according to the content of the notice message. Thus, the state of the same managed equipment 20 after having been changed as indicated in the notice message and the sequence number of the notice message informing a change of the state are stored in the management information storing unit 13 as the management information. The management information updating unit 12 makes a comparison between the sequence number in the management information on the managed equipment 20 stored in the management information storing unit 13 and the sequence number attached to the received notice message. When there is a missing number, in other words, when the above sequence numbers are not continued, the unit 12 informs the controller 14 of it.

The controller 14 may be realized by, for example, a program-controlled CPU and an internal memory such as a RAM or the like. It controls each operation of the interface 11, the management information updating unit 12, and the management information storing unit 13, and upon receipt of a notice informing that the sequence number of a notice message is not successive, from the management information updating unit 12, it supplies a resending instruction of the missing notice message to the managed equipment 20 having created the notice message, via the interface 11. The computer program for controlling the controller 14 is provided, stored in a general storing medium such as a magnetic disk, an optical disk, a semiconductor memory, or the like, and it is loaded in the controller 14 so to execute the above function.

This time, each operation of the managing equipment 10 and the managed equipment 20 will be described with reference to the flow charts of FIGS. 2 and 3.

Figure 2:
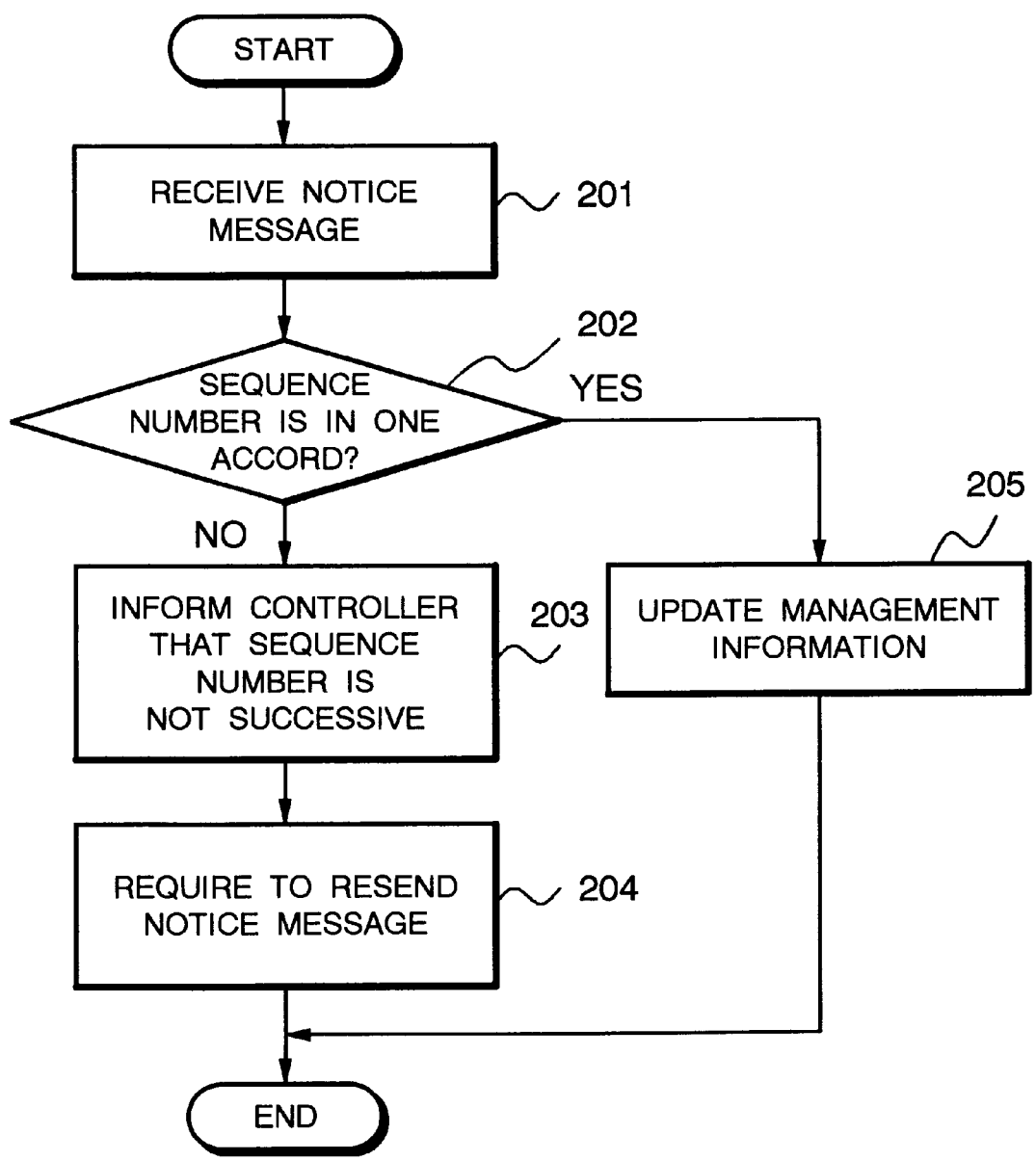
FIG. 2 is a flow chart showing the operation of managing equipment in the embodiment.

FIG. 2 is a flow chart showing the operation of the managing equipment 10. With reference to FIG. 2, when the interface 11 receives a notice message delivered from each managed equipment 20 via a network, in the managing equipment 10 (Step 201), the notice message is delivered to the management information updating unit 12. The management information updating unit 12 makes a comparison between the sequence number included in the management information on the relevant managed equipment 20 stored in the management information storing unit 13 and the sequence number attached to the received notice message. If the sequence number of the notice message is successive, the management information on the relevant managed equipment 20 in the management information storing unit 13 is updated according to the received notice message (Steps 202, and 205).

If the sequence number of the notice message is not successive, it means that there is a notice message which has been lost since it was created by managed equipment 20 before reaching the managing equipment 10. The management information updating unit 12 informs the controller 14 that the sequence number is not successive (Steps 202 and 203). Upon receipt of such information from the management information updating unit 12, the controller 14 sends a resending instruction of the notice message corresponding to the missing sequence number, to the managed equipment 20 and requires the corresponding managed equipment 20 to resend the log of the missing notice message (Step 204).

Figure 3:
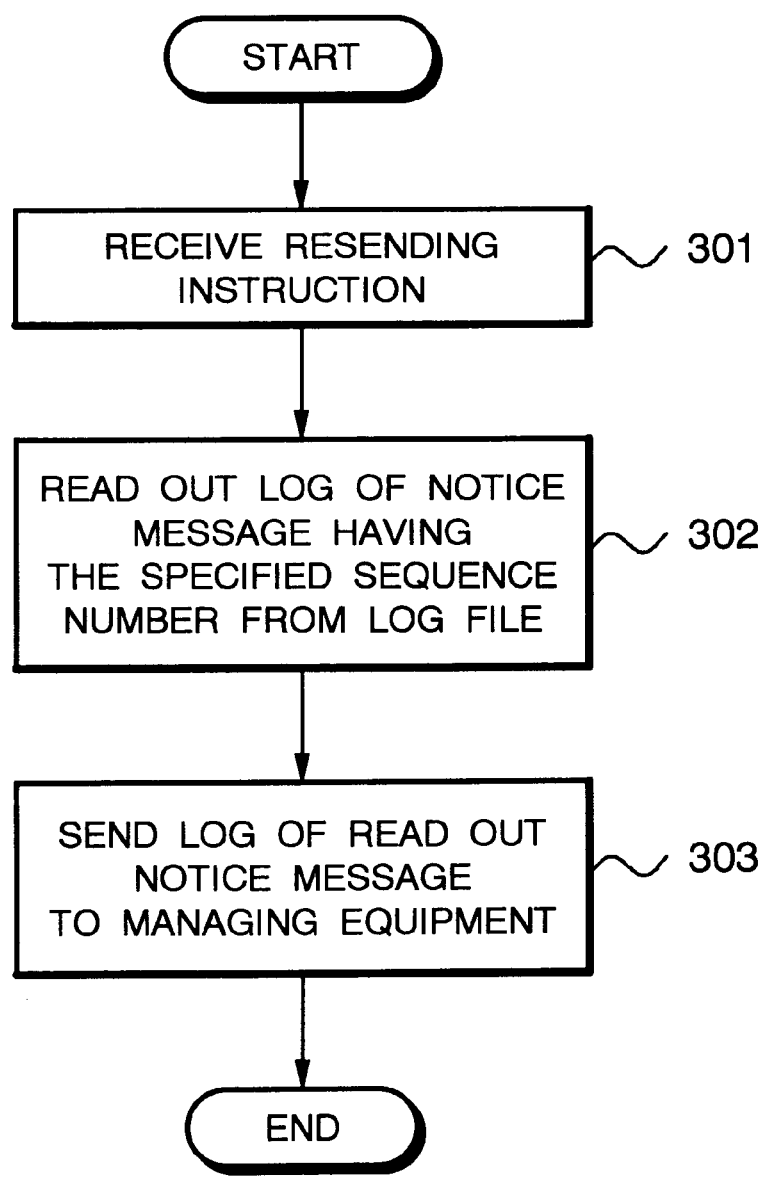
FIG. 3 is a flow chart showing the operation of managed equipment in the embodiment.

FIG. 3 is a flow chart showing the operation of the managed equipment 20 when receiving a resending instruction of a notice message from the managing equipment 10. In managed equipment 20, the state monitor 22 creates a notice message informing the change of the state every time a change of state occurs, delivers it to the managing equipment 10, and stores it in the log file 23, in its usual operation. When the interface 21 of the managed equipment 20 receives the resending instruction of the notice message from the managing equipment 10 via a network (Step 301), the controller 24 reads out the log of the notice message having the sequence number indicated in the resending instruction, from the log file 23 (Step 302), and returns the read out log of the notice message to the managing equipment 10 (Step 303).

In the above description, the state monitor 22 of managed equipment 20 attaches the sequence number to a notice message and the management information updating unit 12 of managing equipment judges whether there is a missing notice message or not depending on whether the sequence numbers of the management information and the notice message are continued or not. However, a method of judging continuity of a notice message is not restricted to the above example. For example, a unique mark based on a given rule, instead of the sequence number, may be attached to a notice message in the state monitor 22. In this case, the management information updating unit 12 judges whether the marks of the management information and the notice message are continued or not, according to the given rule.

Figure 4:
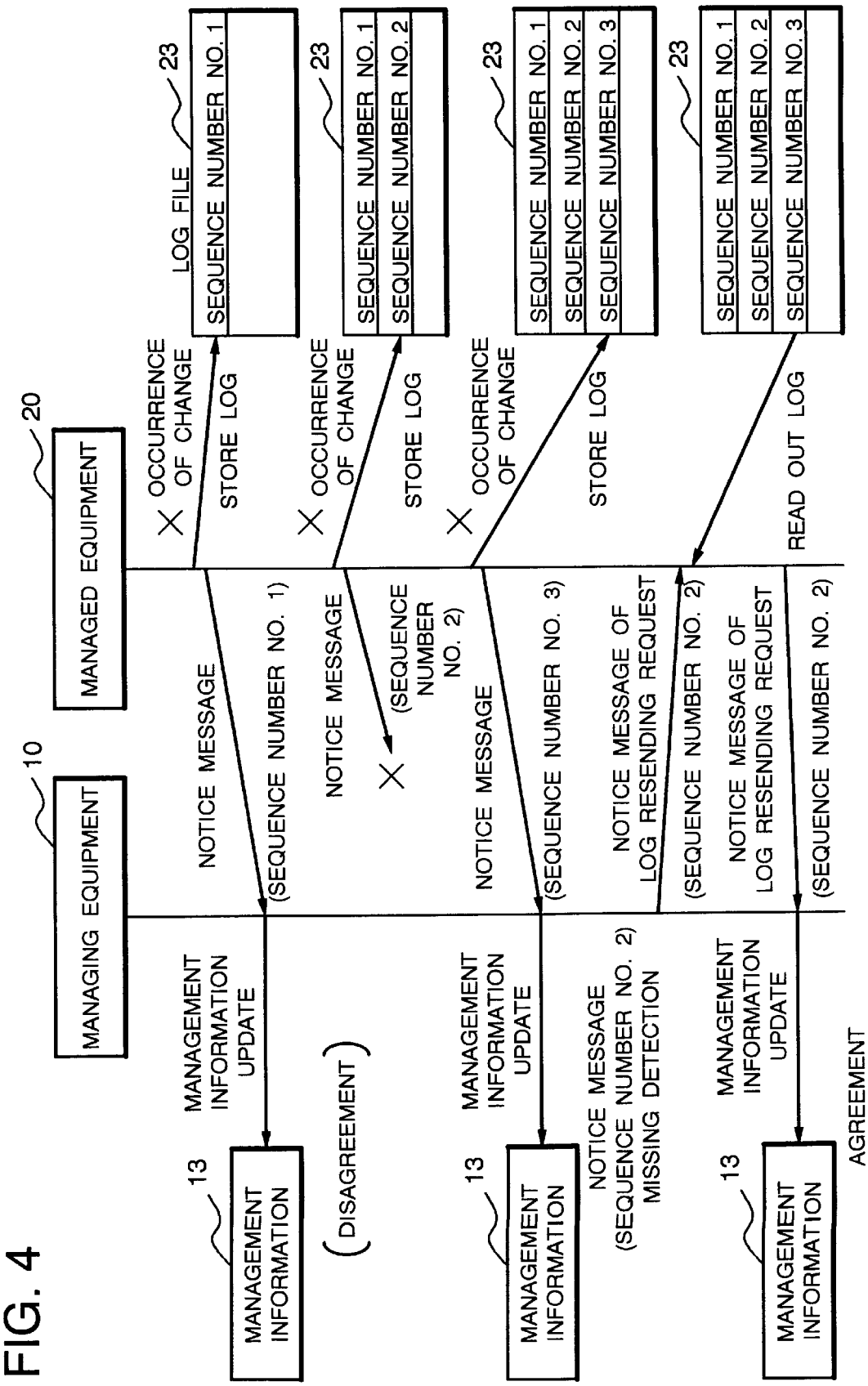
FIG. 4 is a sequence view showing the operation of matching the mutual state of terminal equipment in the embodiment.

FIG. 4 is a sequence view showing the whole flow of the operation according to the embodiment. The operation for matching the mutual state of terminal equipment according to the embodiment will be described with reference to FIG. 4. In the initial stage, the content of the management information of the managing equipment 10 is matched with the state of the managed equipment 20.

When a change of the state occurs in the managed equipment 20, the state monitor 22 of the managed equipment 20 creates a notice message informing the change of the state. The sequence number "No. 1" is attached to the created notice message, then to be stored in the log file 23 and delivered to the managing equipment 10. Upon receipt of the notice message from the managed equipment 20, the managing equipment 10 updates the management information on the corresponding managed equipment 20 in the management information storing unit 23 according to the content of the notice message, so that it may be matched with the state of the corresponding managed equipment 20.

When another change occurs in the managed equipment 20, a notice message informing the change is created and the sequence number "No. 2" is attached to the notice message. The notice message is stored in the log file 23 and delivered to the managing equipment 10. Assume that this notice message is lost on the way of transmission. Since the managing equipment 10 cannot receive this notice message in this case, the management information on the corresponding managed equipment 20 in the management information storing unit 13 is not updated. Therefore, the state of the corresponding managed equipment 20 in the management information is not matched with the actual state of the corresponding managed equipment 20.

Further, when another change occurs in the managed equipment 20, a notice message informing the change is created and the sequence number "No. 3" is attached to the notice message. The notice message is stored in the log file 23 and delivered to the managing equipment 10. When the managing equipment 10 receives the notice message with the sequence number "No. 3" attached there, the management information updating unit 12 makes a comparison between the sequence number "No. 1" included in the management information on the corresponding managed equipment 20 stored in the management information storing unit 13 and the sequence number "No. 3" of the received notice message and recognizes that the sequence number "No. 2" is missing. Then, the controller 14 requires the corresponding managed equipment 20 to resend the notice message having the missing sequence number "No. 2".

The managed equipment 20, upon receipt of the resending request of the notice message from the managing equipment 10, reads out the notice massage having the sequence number "No. 2" being required, from the log file 23 and returns it to the managing equipment 10. The managing equipment 10, upon receipt of the notice message returned from the managed equipment 20 in reply to the resending request, updates the management information on the corresponding managed equipment 20 stored in the management information storing unit 13 according to the content of the reply message.

As set forth hereinabove, according to the network information matching system and its matching method of the present invention, a resending instruction is given to the managed equipment with specification of the missing notice message if having lost a notice message informing that a change of the state occurred in some managed equipment, since it was created, before it reaches the managing equipment, thereby making it possible to match the state of the managed equipment managed by the managing equipment with the actual state of the same managed equipment. Therefore, it is effective in decreasing a lot of communication load taken in order to match the mutual state of terminal equipment.

Further, at the time of discontinuity in the sequence number of a notice message, the managing equipment can recognize that the notice message having the missing sequence number has been lost and require the corresponding managed equipment to resend the notice message at once, thereby making it possible to match the mutual state of the terminal equipment more quickly and easily compared with the case of periodically informing the managing equipment of the change of the state in the managed equipment.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information matching system, performing communication among terminal equipment connected via a network, for matching content of management information about state of managed equipment to be managed by managing equipment with actual state of the managed equipment, wherein said managed equipment comprising, a state monitoring means for monitoring the state of the own equipment, creating a notice message if a change of the state occurs, attaching a sequence number to every created notice message, and delivering it to said managing equipment, a log storing means for storing a log of the sequence number-attached notice message created by said state monitoring means, and a replying means for reading out a log of a necessary notice message from said log storing means according to an instruction of the managing equipment and delivering it to said managing equipment, while said managing equipment comprising, a management information storing means for storing management information about the state of said managed equipment, a management information updating means for updating the management information stored in said management information storing means according to the notice message and the sequence number attached thereto that are delivered from said managed equipment, and checking whether the sequence number included in the management information and the sequence number attached to the notice message are continued or not, and a resending requesting means for giving a resending instruction of a log of the notice message having the missing sequence number to said managed equipment when discontinuity of said sequence numbers is detected by said management information updating means.

2. An information matching system as set forth in claim 1, wherein based on a notice message issued according to occurrence of a change in the state of every managed equipment, said management information storing means stores each combination of the content of the change indicated in the notice message and the corresponding sequence number attached to the notice message, as management information on said managed equipment.

3. An information matching system as set forth in claim 1, wherein said management information updating means checks the continuity and the presence of a missing number by comparison between the sequence number included in the management information stored in said management information storing means and the sequence number attached to the received notice message, and said resending requesting means requires said managed equipment to resend a notice message having the sequence number judged to be missing by said management information updating means.

4. An information matching system as set forth in claim 1, wherein said state monitoring means of said managed equipment detects, at least, a failure of the own equipment and its restoration as a change of the state.

5. An information matching method for performing communication among terminal equipment connected via a network and matching content of management information about state of managed equipment to be managed by managing equipment with actual state of the managed equipment, the method comprising the steps of:

in said managed equipment, a step of monitoring the state of the own equipment, creating a notice message if a change of the state occurs, attaching a sequence number to every created notice message, and delivering it to said managing equipment;

a step of storing a log of the created sequence number-attached notice message in said log storing means; and a step of reading out a log of a necessary notice message from said log storing means according to an instruction from said managing equipment and delivering it to said managing equipment, while in said managing equipment, a step of checking whether the sequence number attached to the notice message delivered from said managed equipment and the sequence number included in the management information are continued or not; and a step of giving a resending instruction of a log of a notice message having the missing sequence number to said managed equipment when said sequence numbers are not continued.

6. An information matching method as set forth in claim 5, further comprising, in said managed equipment, a step of updating the management information based on the notice message and a sequence number attached to the same notice message when said sequence numbers are continued as a result of the examination of said sequence number checking step.

7. A computer readable memory storing a control program for controlling managing equipment and managed equipment, for use in an information matching system, of performing communication among terminal equipment connected via a network, for matching content of management information about the state of the managed equipment to be managed by the managing equipment with actual state of the managed equipment, the control program comprising:

in said managed equipment, a step of monitoring the state of the own equipment, creating a notice message if a change of the state occurs, attaching a sequence number to every created notice message, and delivering it to said managing equipment;

a step of storing a log of the created sequence number-attached notice message in said log storing means; and a step of reading out a log of a necessary notice message from said log storing means according to an instruction from said managing equipment and delivering it to said managing equipment, while in said managing equipment, a step of checking whether the sequence number attached to the notice message delivered from said managed equipment and the sequence number included in the management information are continued or not; and a step of giving a resending instruction of a log of a notice message having the missing sequence number to said managed equipment when said sequence numbers are not continued.

8. A computer readable memory as set forth in claim 7, wherein said control program in the managing equipment further comprising a step of updating the management information based on the notice message and the sequence number attached to the same notice message when said sequence numbers are continued as a result of the examination of said sequence number checking step.

* * * * *